(12) United States Patent
Yu

(10) Patent No.: US 10,417,325 B2
(45) Date of Patent: Sep. 17, 2019

(54) REORGANIZING AND PRESENTING DATA FIELDS WITH ERRONEOUS INPUTS

(71) Applicant: Alibaba Group Holding Limited, George Town, Grand Cayman (KY)

(72) Inventor: Junze Yu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 136 days.

(21) Appl. No.: 14/883,389

(22) Filed: Oct. 14, 2015

(65) Prior Publication Data

US 2016/0110334 A1 Apr. 21, 2016

(30) Foreign Application Priority Data

Oct. 16, 2014 (CN) .......................... 2014 1 0549723

(51) Int. Cl.
*G06F 17/24* (2006.01)
*G06F 3/0481* (2013.01)
*G06F 17/21* (2006.01)
*G06F 11/07* (2006.01)

(52) U.S. Cl.
CPC .......... *G06F 17/243* (2013.01); *G06F 3/0481* (2013.01); *G06F 11/0706* (2013.01); *G06F 11/0769* (2013.01); *G06F 17/211* (2013.01); *G06F 17/245* (2013.01)

(58) Field of Classification Search
CPC .................................................... G06F 17/243
See application file for complete search history.

(56) References Cited

U.S. PATENT DOCUMENTS

| 6,173,400 | B1 | 1/2001 | Perlman et al. |
| 6,489,981 | B1 | 12/2002 | Jones |
| 6,727,929 | B1 | 4/2004 | Bates |
| 7,299,411 | B2 | 11/2007 | Blair |
| 7,447,995 | B2 | 11/2008 | Luciani, Jr. |
| 7,562,070 | B2 | 7/2009 | Tchaitchian |
| 7,603,369 | B2 | 10/2009 | Koganei |
| 7,711,113 | B2 | 5/2010 | Takahashi |
| 7,769,773 | B1 | 8/2010 | Doubek |
| 7,827,481 | B1 | 11/2010 | Greenfield |

(Continued)

FOREIGN PATENT DOCUMENTS

| EP | 2189929 | 5/2010 |
| EP | 2278523 | 1/2011 |
| WO | 2014030455 | 2/2014 |

OTHER PUBLICATIONS

Hinckley, Ken, and Hyunyoung Song. "Sensor Synaesthesia: Touch in Motion, and Motion in Touch." Proceedings of the SIGCHI Conference on Human Factors in Computing Systems. AMC, 2011.

*Primary Examiner* — Scott T Baderman
*Assistant Examiner* — Seung Woon Jung
(74) *Attorney, Agent, or Firm* — Shun Yao; Park, Vaughan, Fleming, & Dowler LLP

(57) ABSTRACT

One embodiment of the present invention provides a system for re-entering erroneously entered data fields in a web form. During operation, the system identifies one or more data fields with erroneous inputs in a first web form. Upon submission of the first web form, the system restructures the identified data fields based on association information of a respective identified data field and displays the restructured data fields in a resubmission window distinct from the first web form.

21 Claims, 9 Drawing Sheets

(56) References Cited

U.S. PATENT DOCUMENTS

| | | | |
|---|---|---|---|
| 7,904,835 B1 | 3/2011 | Dhawan | |
| 8,117,450 B2 | 2/2012 | Krawetz | |
| 8,619,983 B2 | 12/2013 | Tao | |
| 8,621,203 B2 | 12/2013 | Ekberg | |
| 9,317,484 B1* | 4/2016 | Ho | G06F 17/2725 |
| 2002/0016721 A1* | 2/2002 | Mason | G06F 19/3418 |
| | | | 705/3 |
| 2003/0095150 A1* | 5/2003 | Trevino | G01R 33/546 |
| | | | 715/810 |
| 2004/0133855 A1 | 7/2004 | Blair | |
| 2005/0035976 A1 | 2/2005 | Ecob | |
| 2005/0233287 A1 | 10/2005 | Bulatov | |
| 2006/0143571 A1 | 6/2006 | Chan | |
| 2006/0156012 A1 | 7/2006 | Beeson | |
| 2006/0210078 A1 | 9/2006 | Sakamura | |
| 2006/0230352 A1* | 10/2006 | Nielsen | G06F 17/243 |
| | | | 715/700 |
| 2007/0192678 A1 | 8/2007 | Tang | |
| 2007/0192689 A1* | 8/2007 | Johnson | G06F 9/4443 |
| | | | 715/700 |
| 2007/0198910 A1 | 8/2007 | Jensen | |
| 2007/0288501 A1 | 12/2007 | Estrada | |
| 2007/0294644 A1 | 12/2007 | Yost | |
| 2008/0168345 A1 | 7/2008 | Becker | |
| 2008/0186162 A1 | 8/2008 | Rajan | |
| 2008/0207169 A1 | 8/2008 | Park | |
| 2008/0212771 A1 | 9/2008 | Hauser | |
| 2008/0215976 A1 | 9/2008 | Bierner | |
| 2009/0112968 A1 | 4/2009 | Matsune | |
| 2009/0217145 A1 | 8/2009 | Watson | |
| 2010/0125541 A1* | 5/2010 | Wendel | G06F 9/4443 |
| | | | 706/47 |
| 2010/0184378 A1 | 7/2010 | Wakefield | |
| 2010/0216429 A1 | 8/2010 | Mahajan | |
| 2010/0229224 A1 | 9/2010 | Etchegoyen | |
| 2010/0266125 A1 | 10/2010 | Tanaka | |
| 2010/0325441 A1 | 12/2010 | Laurie | |
| 2011/0185402 A1 | 7/2011 | Wang | |
| 2011/0314091 A1 | 12/2011 | Podjarny | |
| 2012/0102558 A1 | 4/2012 | Muraki | |
| 2012/0133678 A1 | 5/2012 | Kim | |
| 2012/0144457 A1 | 6/2012 | Counterman | |
| 2012/0206350 A1 | 8/2012 | Figaro | |
| 2012/0268244 A1 | 10/2012 | Ljung | |
| 2013/0024763 A1 | 1/2013 | Nemati | |
| 2013/0113731 A1 | 5/2013 | Yoo | |
| 2013/0159839 A1 | 6/2013 | Joffray | |
| 2013/0174021 A1 | 7/2013 | Buchwald | |
| 2013/0174120 A1 | 7/2013 | Kalaidjian | |
| 2013/0219268 A1* | 8/2013 | Straten | G06F 17/243 |
| | | | 715/256 |
| 2013/0265250 A1 | 10/2013 | Ishikawa | |
| 2014/0009499 A1 | 1/2014 | Gaerdenfors | |
| 2014/0066015 A1 | 3/2014 | Aissi | |
| 2014/0092018 A1 | 4/2014 | Geithner | |
| 2014/0095579 A1 | 4/2014 | Shah | |
| 2014/0136956 A1 | 5/2014 | Wong | |
| 2014/0149844 A1 | 5/2014 | Podjarny | |
| 2014/0214779 A1 | 7/2014 | Francis | |
| 2014/0289612 A1 | 9/2014 | Mi | |
| 2015/0039883 A1 | 2/2015 | Yoon | |
| 2015/0200941 A1 | 7/2015 | Muppidi | |
| 2016/0072819 A1 | 3/2016 | Chen | |
| 2016/0105410 A1 | 4/2016 | Zhou | |
| 2016/0139788 A1 | 5/2016 | Nishikori | |

* cited by examiner

FIG. 1A

| DATA FIELD | ASSOCIATION INFORMATION | CATEGORY |
|---|---|---|
| CUSTOMER NAME | CUSTOMER NAME | BASIC INFO OF CUSTOMER |
| NICKNAME | CUSTOMER NAME | BASIC INFO OF CUSTOMER |
| GENDER | | BASIC INFO OF CUSTOMER |
| AGE | | BASIC INFO OF CUSTOMER |
| CONTACT NAME | CONTACT NAME | CONTACT INFO OF CUSTOMER |
| TELEPHONE | CONTACT NAME | CONTACT INFO OF CUSTOMER |
| EMAIL | CONTACT NAME | CONTACT INFO OF CUSTOMER |
| REMARKS | | OTHER INFO |

FIG. 4A

| IDENTIFIER | DATA FIELD | TYPE | LENGTH | CURRENT VALUE | ERROR MESSAGE |
|---|---|---|---|---|---|
| ID 412 | CUSTOMER NAME | STRING | 50 | | |
| ID 414 | NICKNAME | STRING | 50 | XYZ | CANNOT BE BLANK |
| ID 416 | CONTACT NAME | STRING | 50 | ABC | |
| ID 418 | TELEPHONE | NUMERIC | 11 | 12345 | INCORRECT LENGTH |

FIG. 4B

BASIC INFORMATION OF CUSTOMER

| CUSTOMER NAME | XYZ |
| --- | --- |
| NICKNAME | |

NICKNAME: CANNOT BE BLANK

CONTACT INFORMATION OF CUSTOMER

| CONTACT NAME | ABC |
| --- | --- |
| TELEPHONE | |

TELEPHONE: INCORRECT LENGTH

REORGANIZING AND PRESENTING DATA FIELDS WITH ERRONEOUS INPUTS

RELATED APPLICATION

Under 35 U.S.C. 119, this application claims the benefit and right of priority of Chinese Patent Application No. 201410549723.7, filed 16 Oct. 2014.

BACKGROUND

Field

The present invention relates to the technical field of data processing, and in particular, relates to a method and system for reorganizing and presenting data.

Related Art

For web pages, a common input method for a user to enter data is to use web forms. A web form can include a plurality of data fields. In particular, the widely used Boostrap web form can accommodate as many as 50 to 100 or even more data-entry fields.

When entering data, a user could make mistakes. For example, the user might use an invalid input format, exceed the limit of the number of characters, or leave one or more input fields blank. When the user completes the form data entry and submits or stores the form, the system typically verifies the data entered by the user. If an input error for any data field is detected, the system typically does not allow the form to be submitted or stored. In this case, the system may return to the form page where the original data fields are presented and request the user to re-enter the data fields for which errors have been detected (i.e., have erroneous inputs).

Typically, the system may prompt input rules (i.e., the correct input format) near the corresponding data fields to reduce occurrence of data input errors. For example, a rule specifying "Input may not exceed 200 characters" may be displayed near an input field. Although a number of ways such error messages are displayed, some problems still remain in efficiently recollecting erroneous data from a user.

SUMMARY

One embodiment of the present invention provides a system for re-entering erroneously entered data fields in a web form. During operation, the system identifies one or more data fields with erroneous inputs in a first web form. Upon submission of the first web form, the system restructures the identified data fields based on association information of a respective identified data field and displays the restructured data fields in a resubmission window distinct from the first web form.

In a variation of this embodiment, for identifying the one or more data fields, the system determines whether a data field is associated with an error message.

In a further variation, the system displays the error message with the associated data field in the resubmission window.

In a variation of this embodiment, the system identifies an associated data field for a first data field of the one or more data fields, obtains a current value for the associated data field, and displays a name of the associated data field and the current value with the first data field in the resubmission window.

In a further variation, the system avoids repetition of the associated data field and the current value for a second data field of the one or more data fields in the resubmission window. The associated data field is associated with the second data field.

In a variation of this embodiment, the system identifies categorization information for a first data field of the one or more data fields and displays the first data field in the resubmission window based on the categorization information.

In a variation of this embodiment, the system controls the resubmission window to constantly stay at a predetermined position on a screen displaying the resubmission window.

In a variation of this embodiment, the resubmission window is one of: (i) a floating div, (ii) a JavaScript popup window, and (iii) a second web form in a separate tab or window in a browser.

In a variation of this embodiment, upon submission of the first form, the system precludes a user of the first form from going back to the first form for a data input.

In a variation of this embodiment, the system orders the identified data fields in the resubmission window based on an order of the identified data fields in the first form.

BRIEF DESCRIPTION OF THE DRAWINGS

The accompanying drawings herein, which are incorporated herein and constitute a part of the specification, illustrate several exemplary embodiments of the present application and together with the description, serve to illustrate the present application, construing no limitation to the present application. In the drawings:

Figure 1A:
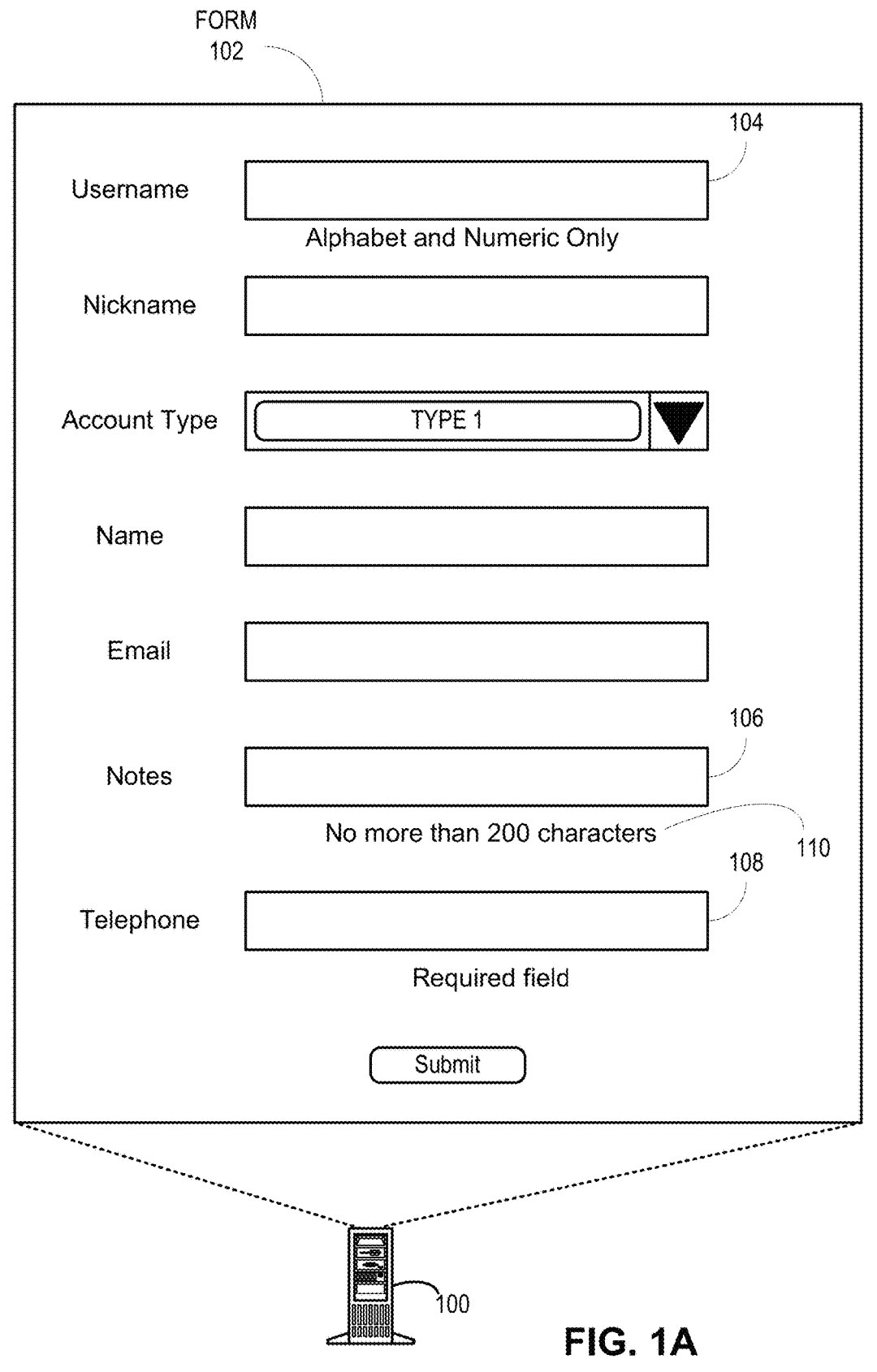

FIG. 1A illustrates an exemplary web form with erroneous inputs.

FIG. 4A illustrates an exemplary association table comprising association (and category) information of the data fields of a form, in accordance with an embodiment of the present application.

FIG. 4B illustrates an exemplary configuration table comprising configuration, value, and error information of the data fields of a form, in accordance with an embodiment of the present application.

FIG. 4C illustrates exemplary restructured data fields with erroneous inputs, in accordance with an embodiment of the present application.

DETAILED DESCRIPTION OF EMBODIMENTS

Figure 1B:
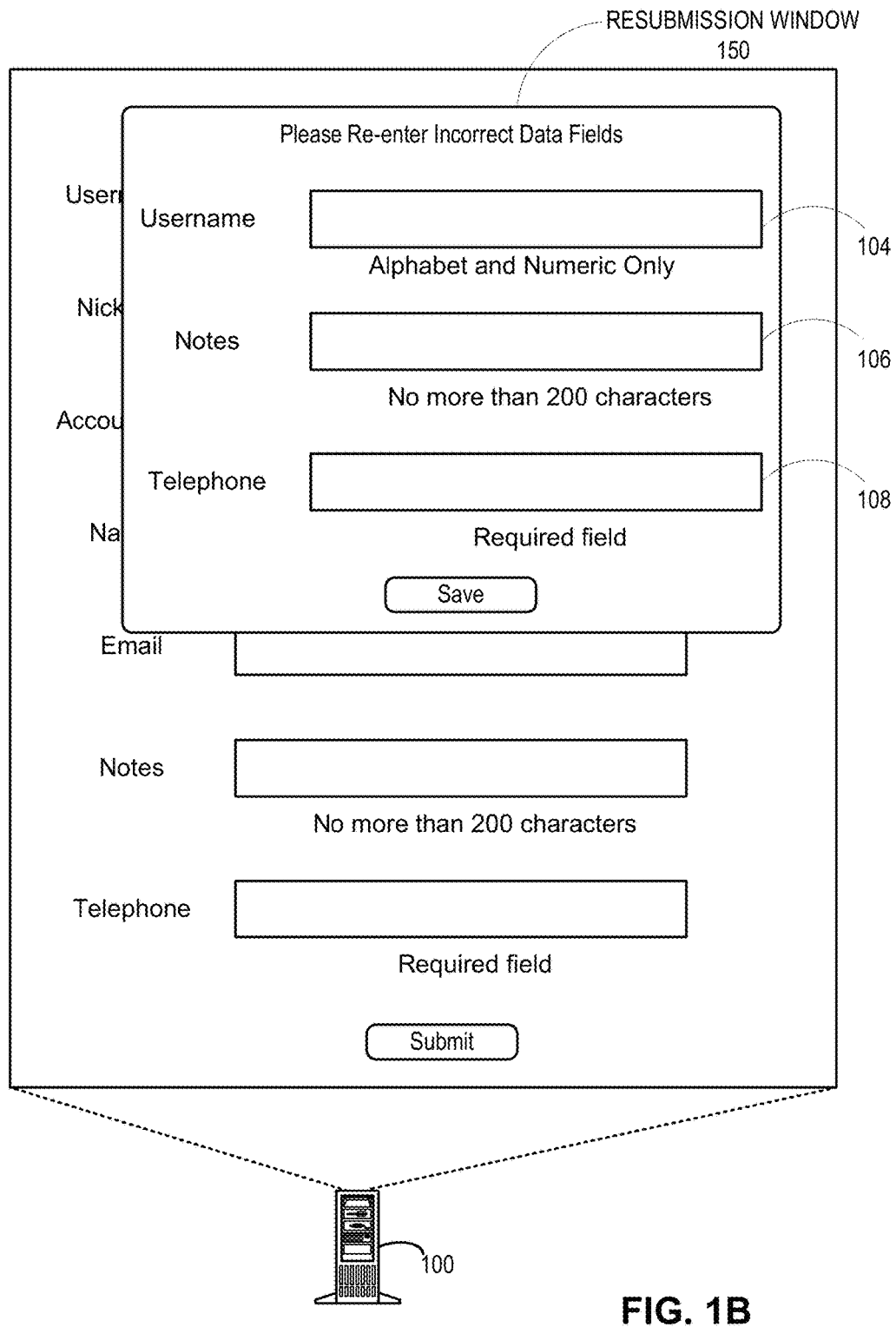
FIG. 1B illustrates an exemplary restructured data fields with erroneous inputs in a resubmission window, in accordance with an embodiment of the present application.

In the figures, like reference numerals refer to the same figure elements.

Embodiments of the present invention solve the problem of requesting a user, in an efficient and user-friendly manner, to re-enter erroneously entered data fields in a web form by restructuring and displaying only those data fields. With existing technologies, when a system verifies the entered data and detects an input error, regardless of the number and locations of the erroneously entered data fields, the system still returns to the original form page to the user and requests the user to correct the mistakenly entered data fields. When locating and correcting the mistakenly entered data fields, the user would need to search for each such data field, until the last one is found and corrected. In this process, the user might scroll down a long web form, and the system might need to display a large number of data fields, even though majority of these data fields have correct data. Often, the user might need to enter multiple commands (such dragging a mouse, scrolling a wheel, etc.) to navigate through a long form and identify the data fields that need correction. This could significantly reduce the data processing efficiency and be frustrating to the user to find the data fields that need correction.

To solve this problem, embodiments of the present invention provides a system that restructures the data fields with erroneous inputs in another resubmission window on the page displaying the form and displays only these data fields to a user. Examples of a resubmission window include, but are not limited to, a window or tab of a browser, a floating div, and a popup window. The system prompts the user of the context associated with these data fields, which indicate where the data fields were originally located. In this way, the user can be reminded of the correct content to be entered into these data fields. Furthermore, the system can also include a reminder of the correct data input format. For example, if a data field only accepts numeric digits and a user has provided an alphanumerical input, the system displays only that data field and reminds the user that the data field only accepts numeric inputs.

FIG. 1A illustrates an exemplary web form with erroneous inputs. As illustrated in FIG. 1A, a form 102 comprises a plurality of data fields. In some embodiments, form 102 is a HyperText Markup Language (HTML) form, which can be displayed in a browser. Form 102 can support both client-side scripting (e.g., JavaScript) and server-side scripting (e.g., Active Server Pages (ASP) and JavaServer Pages (JSP)). A user provides inputs to the corresponding data fields. For example, form 102 includes a data field 104 for a username of a user account. Data field 104 accepts an alphanumeric input from the user. In some embodiments, a data representation system 100 verifies the input (i.e., the entered data) from the user. System 100 can be hosting (e.g., a server) or displaying (e.g., a client) form 102.

Suppose that the input to data fields 104 (username), 106 (notes), and 108 (telephone) of form 102 include erroneous inputs. With existing technologies, when system 100 detects the errors, regardless of the number and locations of the erroneously entered data fields, system 100 still returns to original form 102 to the user and requests the user to correct the mistakenly entered data fields. For example, system 100 inserts an error message 110 indicating that data field 106 cannot be more that two hundred characters long and returns to form 102.

However, when locating and correcting data fields 104, 106, and 108, the user would need to search for each such data field in form 102, until the last one is found and corrected. If form 102 is a long web form, the user need to scroll down and check a large number of data fields, even though majority of these data fields may have correct data. Often, the user might need to enter multiple commands (such dragging a mouse, scrolling a wheel, etc.) to navigate through a long form and identify data fields 104, 106, and 108. This could significantly reduce the data processing efficiency and be frustrating to the user to find the data fields that need correction.

To solve this problem, system 100 can restructure data fields 104, 106, and 108, and display only these data fields to the user. FIG. 1B illustrates an exemplary restructured data fields with erroneous inputs in a resubmission window, in accordance with an embodiment of the present application. In this example, system 100 displays these selected data fields 104, 106, and 108 in another resubmission window 150. It should be noted that displaying these selected data fields include both displaying the name of the data field and the corresponding input field (e.g., as they appear on form 102). Resubmission window 150 can be a window or tab (e.g., of a browser), or in a floating window (e.g., a JavaScript popup window or a floating div) on the page displaying form 102.

System 100 provides the user with the context associated with these data fields, which indicates where these data fields are originally located. In this way, the user can be reminded of the correct content to be entered into these data fields. In resubmission window 150, data fields 104, 106, and 108 appear in an order they have appeared in form 102. Furthermore, system 100 can add a reminder in resubmission window 150 indicating the correct input format of a respective data field. For example, if data field 108 (telephone) is empty, system 100 reminds the user that it's a required field (i.e., the input should not be empty).

Since resubmission window 150 can receive the previously erroneous user inputs of form 102, upon submission of form 102, system 100 can preclude the user from going back to form 102 for any data input. In other words, when the user submits form 102, system 100 only uses resubmission window 150 for any subsequent inputs from the user. Furthermore, if the user provides any erroneous input to a data field in resubmission window 150, system 100 can generate another resubmission window comprising that data field and precludes the user from going back to resubmission window 150 for an input. In this way, system 100 continues to use new resubmission windows for the data fields with erroneous inputs. It should be noted that the process of identifying data fields with erroneous inputs in resubmission window 150 can be similar to form 102. On the other hand, if resubmission window 150 is short (e.g., includes fewer data fields than a threshold), system 100 can continue to use resubmission window 150 for subsequent erroneous inputs.

In some embodiments, resubmission window 150 may be displayed as a "floating div" (e.g., an HTML floating div). To allow the user to easily concentrate on resubmission window 150, the floating div can be controlled to constantly stay at a predetermined position on the screen (e.g., a computer, cell phone, or tablet screen) currently displaying resubmission window 150. This predetermined position can be the center of the screen or defined based on other properties (e.g., the current screen size and/or type). The system can control the floating div to constantly stay at the predetermined position on the screen by calculating the relative position of the screen based on the movement of a pointing device. In some embodiments, the system determines the position based on the formula: vertical position of the scroll bar of the current browser+(visible height of the browser window–visible height of the current object)/2. For example, in JavaScript, the formula can be: document.body.scrollTop+(document.body.clientHeight–this.clientHeight)/2).

Figure 2:
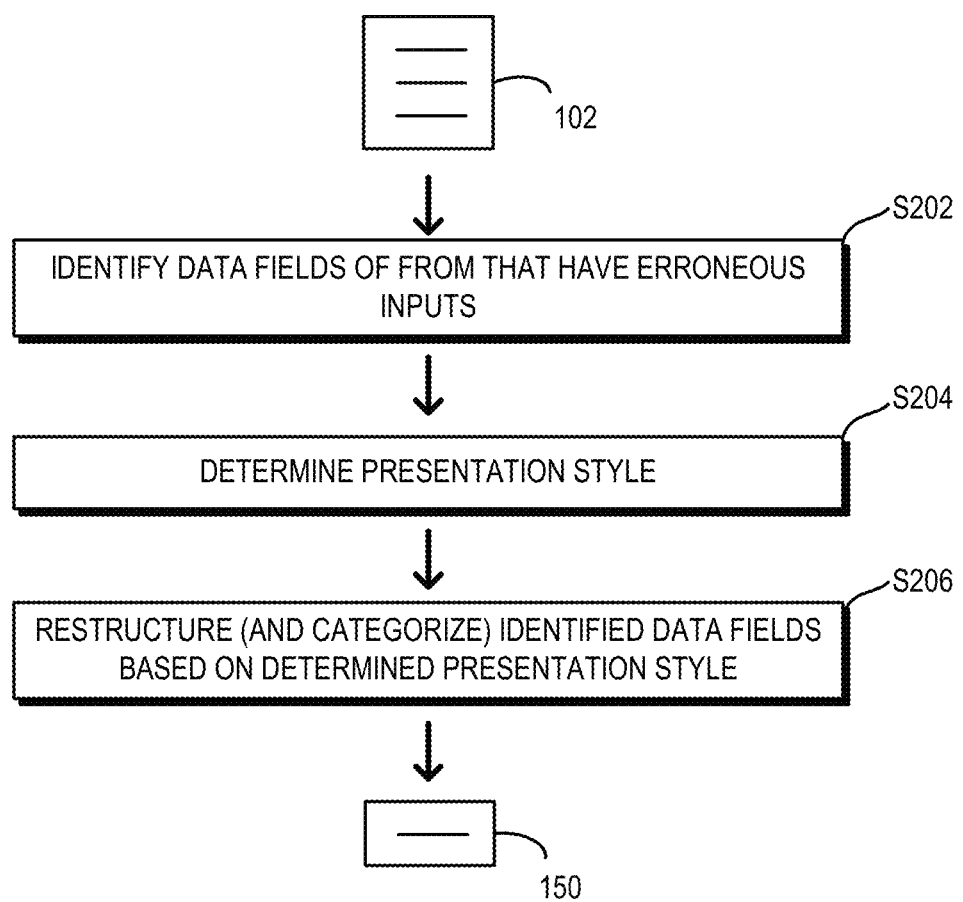
FIG. 2 illustrates an exemplary process of a data representation system generating a restructured resubmission window comprising data fields with erroneous inputs, in accordance with an embodiment of the present application.

FIG. 2 illustrates an exemplary process of a data representation system generating a restructured resubmission window comprising data fields with erroneous inputs, in accordance with an embodiment of the present application. During operation, the system identifies the data fields of form 102 (i.e., the original form) that have erroneous inputs (operation S202). The system then determines a presentation style for presenting the identified data fields to the user (operation S204). The system then restructures the identified data fields based on the determined presentation style (e.g., association information of the data fields) (operation S206). The system can also categorize the data fields based on the presentation style (e.g., categorization information of the data fields). In this way, the system generates resubmission window 150 (i.e., the resubmission form) comprising data fields 104, 106, and 108 of form 102.

Figure 3:
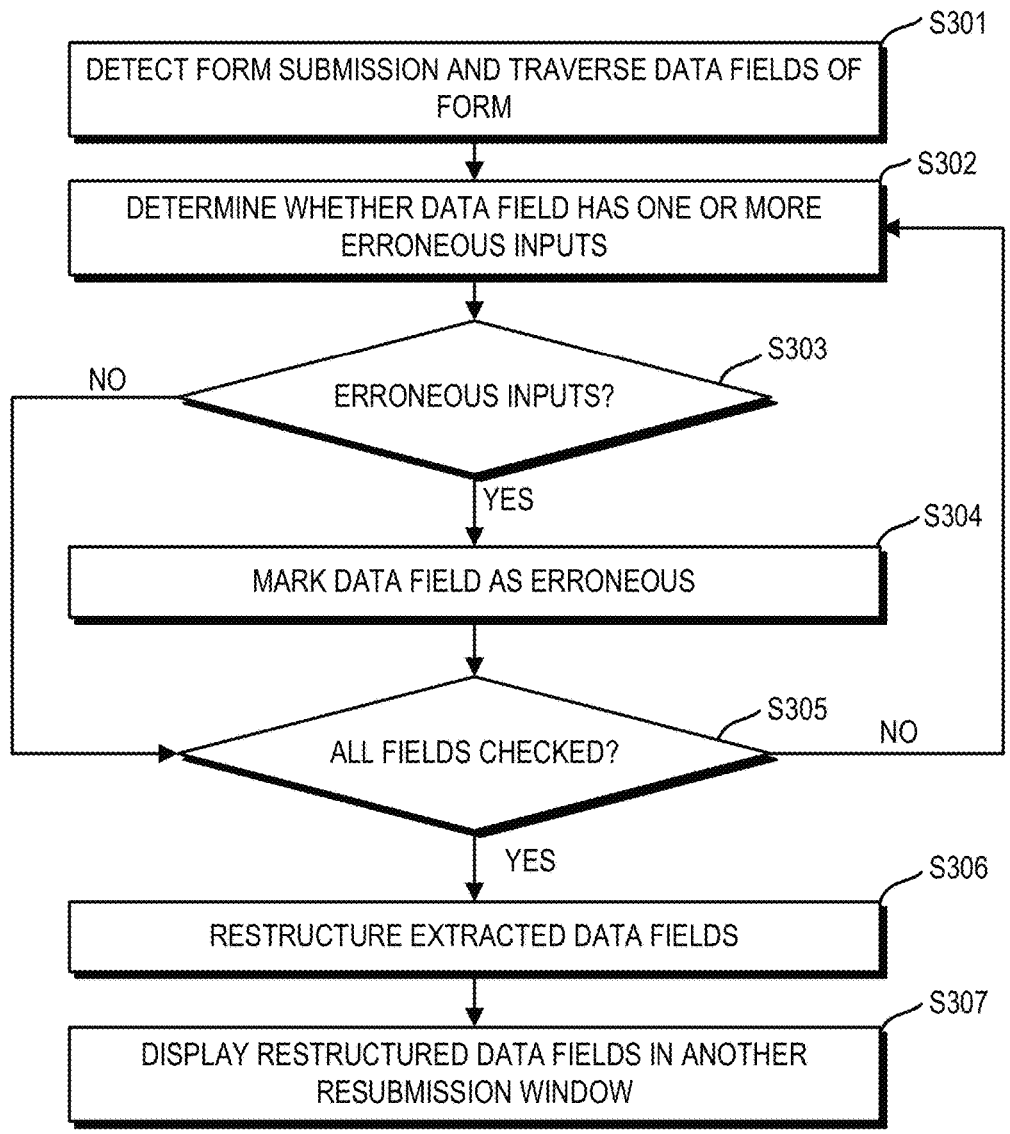
FIG. 3 presents a flowchart illustrating the process of a data representation system generating a restructured resubmission window comprising data fields with erroneous inputs, in accordance with an embodiment of the present application.

FIG. 3 presents a flowchart illustrating the process of a data representation system generating a restructured resubmission window comprising data fields with erroneous inputs, in accordance with an embodiment of the present application. During operation, the system detects a form submission and traverses the data fields of the form (operation S301). The system determines whether a data field of the form has one or more erroneous inputs (operation S302). A erroneous input is caused during the data entering process of a user. The system then checks whether an erroneous input exists for the data field (operation S303). If an erroneous input exists for the data field, the system marks the data field as erroneous (operation S304). If an erroneous input does not exist for the data field or the system has marked the data field, the system determines whether all fields have been checked (operation S305). If all fields have not been checked, the system determines whether the next data field of the form has an erroneous input (operation S302).

If all fields have been checked, the system restructures the extracted data fields (operation S306). In the example in FIGS. 1A and 1B, the system verifies the respective values of the data fields in form 102. The system identifies data fields with erroneous inputs from form 102 based on the verification. The system then restructures and reorganizes the identified data fields so that a resubmission window (e.g., resubmission window 150 in FIG. 1B) can be constructed from the restructured data fields. During the restructuring process, the system can order the identified data fields based on the order of the data fields in original form (e.g., form 102). Furthermore, the identified data fields can also be categorized based on a categorization of the data fields.

The system then displays the restructured data fields in another resubmission window (operation S307), as described in conjunction with FIG. 1B. The resubmission window can be another form in a browser. The resubmission window can also be a floating window. The resubmission window includes the data fields with erroneous inputs from the original form (e.g., form 102). In this way, the user directly provides inputs in the resubmission window, thereby avoiding returning to the original form and searching the form for the data fields with erroneous inputs.

In some embodiments, the system can generate one or more tables to represent different aspects of the data fields of an original form. FIG. 4A illustrates an exemplary association table comprising association (and category) information of the data fields of a form, in accordance with an embodiment of the present application. A data representation system can generate an association table 400, which represents the association information of one or more data fields of an original form. For example, entries 402 and 404 of table 400 correspond to a customer's name and an account nickname of a customer (e.g., of an online shopping service). Table 400 indicates that a nickname of the account is associated with the customer name. Similarly, entries 406 and 408 of table 400 correspond to the account's contact name and a telephone number. Table 400 indicates that the telephone number is associated with the contact name.

In some embodiments, table 400 also includes category information of the data fields. It should be noted that the category information can also be in a separate table. This category information categorizes different data fields of a form. For example, entries 402 and 404 of table 400 can be categorized as a customer's basic information, and entries 406 and 408 of table 400 can be categorized as the customer's contact information. The association information in table 400 allows the system to obtain associated information of a data field with erroneous input in the resubmission window. Furthermore, the categorization information in table 400 allows the system to group the data fields with erroneous inputs based on their respective categories. In this way, the system provides a context of the data fields to the user, thereby providing the user with a better understanding of the correct inputs of the data fields.

FIG. 4B illustrates an exemplary configuration table comprising configuration, value, and error information of the data fields of a form, in accordance with an embodiment of the present application. A data representation system can generate a configuration table 410. Table 410 includes an identifier, name, type, length, current value, and error message, if any, for one or more data fields of the original form. In some embodiments, the system uses a div identifier as the identifier of a data field. For example, the system uses identifiers 412, 414, 416, and 418 for data fields "customer name," "nickname," "contact name," and "telephone," respectively. To identify the data fields with erroneous inputs, the system can traverse the entries (i.e., the rows) of table 410 and checks whether an entry has an error message. Upon identifying such an entry, the system can use the identifier of that entry for subsequent references to the data field. For example, the system can use the identifier to extract the data field from the original form and insert into the resubmission window.

FIG. 4C illustrates exemplary restructured data fields with erroneous inputs, in accordance with an embodiment of the present application. Suppose that, in the examples in FIGS. 4A and 4B, data fields "nickname" and "telephone" have erroneous inputs. A data representation system obtains association information of these data fields by determining that data fields "nickname" and "telephone" are associated with data fields "customer name" and "contact name," respectively. Data fields "customer name" and "contact name" can be referred to as the associated data fields for data fields "nickname" and "telephone," respectively. The system then obtains the current values "XYZ" and "ABC" of "customer name" and "contact name," respectively, from table 410. The system inserts the names of the associated data fields, as obtained from table 400, and corresponding current values, as obtained from table 410, before the corresponding data fields with erroneous inputs.

In the example in FIG. 4C, the system generates a resubmission window 450 for data fields "nickname" and "telephone." The system inserts associated data field name "customer name" and its current value "XYZ" before (or after) "nickname" in resubmission window 450. The system also inserts associated data field name "contact name" and its current value "ABC" before (or after) "telephone." In this way, the system provides a context for the data fields with erroneous inputs. In some embodiments, the system also obtains the error message from table 410 for data fields "nickname" and "telephone," and inserts the messages next to the corresponding data fields. The system can obtain the error messages based on identifiers 414 and 418 of data fields "nickname" and "telephone," respectively, from table 410.

In some embodiments, the system categorizes the data fields in resubmission window 450 based on their respective categories from table 400. For example, the system can obtain the categories for entries 402, 404, 406, and 408 (i.e., for the data fields with erroneous inputs and their associated data fields). The system then categorizes the data fields in resubmission window 450. For example, since the category for data fields "customer name" and "nickname" is "basic information of customer," the system groups these data fields together in resubmission window 450. Similarly, since the category for data fields "contact name" and "telephone" is "contact information of customer," the system groups these data fields together in resubmission window 450. The system can also insert the corresponding category for a respective group. In this way, in resubmission window 450, the system restructures and categorizes the data fields based on the presentation styles described in conjunction with FIGS. 4A and 4B.

Figure 5A:
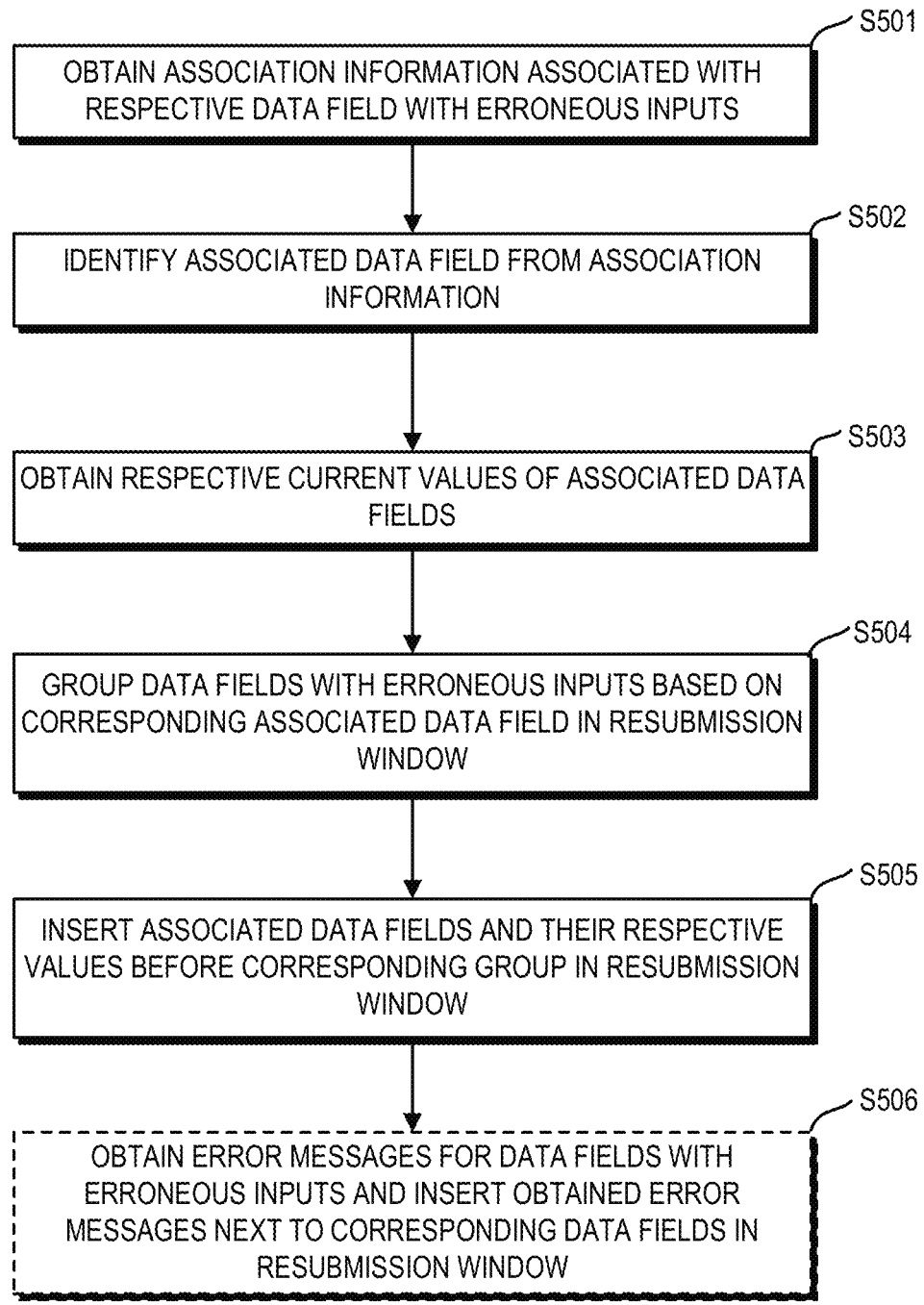
FIG. 5A presents a flowchart illustrating the process of a data representation system restructuring the data fields with erroneous inputs, in accordance with an embodiment of the present application.

FIG. 5A presents a flowchart illustrating the process of a data representation system restructuring the data fields with one or more erroneous inputs, in accordance with an embodiment of the present application. During operation, the system obtains association information associated with a respective data field with erroneous inputs (e.g., from an association table) (operation S501). The system then identifies the associated data fields from the association information (operation S502) and obtains the respective current values of the associated data fields (e.g., from a configuration table) (operation S503). Since a plurality of data fields can have the same associated data field, the system groups the data fields with erroneous inputs based on the corresponding associated data field in a resubmission window (operation S504). The system then inserts the associated data field names and their corresponding values before the corresponding group in the resubmission window (operation S505). This prevents repetition of an associated data field.

It should be noted that the system may repeat an associated data field in the resubmission window. The system can also remove the repeated associated data fields from a resubmission window. Under such circumstances, the system may not group the data fields with erroneous inputs and insets data fields individually in the resubmission window. In some embodiments, the system can obtain the error messages for the data fields with erroneous inputs and inserts the obtained error messages next to the corresponding data fields in the resubmission window (operation S506), as described in conjunction with FIG. 4C.

Figure 5B:
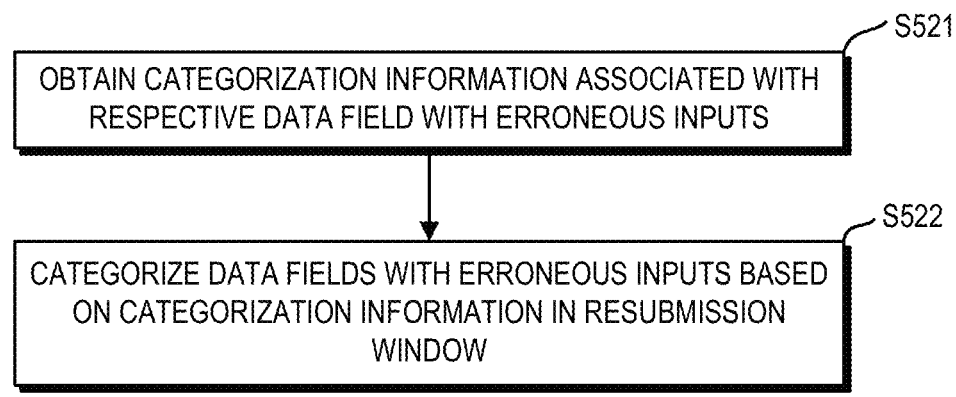
FIG. 5B presents a flowchart illustrating the process of a data representation system categorizing the data fields with erroneous inputs, in accordance with an embodiment of the present application.

FIG. 5B presents a flowchart illustrating the process of a data representation system categorizing the data fields with erroneous inputs, in accordance with an embodiment of the present application. During operation, the system obtains categorization information associated with a respective data field with erroneous inputs (operation S521), as described in conjunction with FIG. 4A. The system then categorizes the data fields with erroneous inputs based on the categorization information in the resubmission window (operation S522), as described in conjunction with FIG. 4C. In some embodiments, the system also includes the categories in the resubmission window next to a respective category of the data fields.

Exemplary Apparatus

Figure 6:
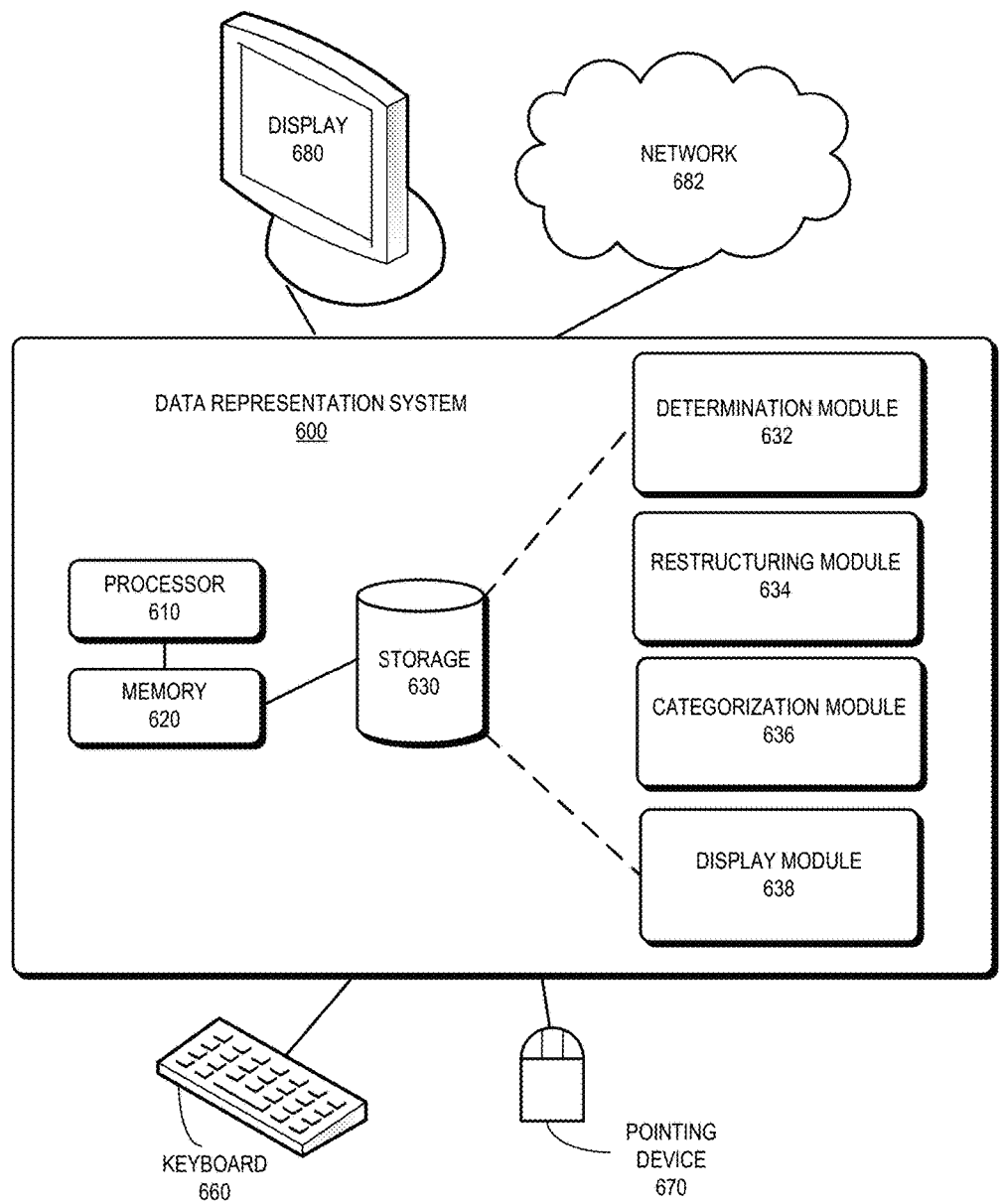
FIG. 6 is a schematic structural diagram of an exemplary data representation system, in accordance with an embodiment of the present application.

FIG. 6 is a schematic structural diagram of an exemplary data representation system, in accordance with an embodiment of the present application. A data representation system 600 can be used for re-entering erroneously entered data fields in a web form by restructuring and displaying only those data fields. System 600 includes a processor 610, a memory 620, and a storage device 630. Storage device 630 typically stores instructions that can be loaded into memory 620 and executed by processor 610 to perform the methods described above. In one embodiment, the instructions in storage 630 can implement a determination module 632, a restructuring module 634, a categorization module 636, and a display module 638, all of which can communication with each other through various means.

In some embodiments, modules 632, 634, 636, and 638 can be partially or entirely implemented in hardware and can be part of processor 610. Further, in some embodiments, the system may not include a separate processor and memory. Instead, in addition to performing their specific tasks, modules 632, 634, 636, and 638, either separately or in concert, may be part of special-purpose computation engines.

Storage 630 stores programs to be executed by processor 610. Specifically, storage 630 stores a program that implements a system (application) for re-enter data fields in a form with erroneous inputs. During operation, the application program can be loaded from storage 630 into memory 620 and executed by processor 610. As a result, system 600 can perform the functions described above. System 600 can be further coupled to an optional display 680, a keyboard 660, and a pointing device 670, and can be coupled via one or more network interfaces to a network 682.

During operation, determination module 632 determines the data fields with erroneous inputs from a web form, as described in conjunction with FIG. 3. Restructuring module 634 restructures the data fields in a resubmission window, as described in conjunction with FIG. 5A. Categorization module 636 categorizes the data fields in a resubmission window, as described in conjunction with FIG. 5B. Display module 638 controls the resubmission window and displays the restructured and categorized data fields in the resubmission window, as described in conjunction with FIGS. 1B and 4C.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for re-entering erroneously entered data fields in a web form, comprising:
   obtaining, by a computing device, inputs via a plurality of data fields in the web form based on an electronic submission of the web form;
   identifying a plurality of data fields with erroneous inputs in the web form;
   restructuring the identified data fields based on an order of appearance of the identified data fields in the web form;
   displaying the restructured data fields in a resubmission window distinct from the web form without displaying a data field of the web form with a correct input, wherein the resubmission window allows a user to reenter inputs into the restructured data fields and electronically submit the resubmission window;
   identifying a name and a current value of an associated data field for a first and a second data fields of the plurality of data fields;
   grouping the first and the second data fields into a group in the resubmission window based on the associated data field; and
   displaying the name and the current value of the associated data field with the group in the resubmission window once.

2. The method of claim 1, wherein identifying the one or more data fields comprises determining whether a first data field of the one or more data fields is associated with an error message.

3. The method of claim 2, further comprising displaying the error message with the first data field in the resubmission window.

4. The method of claim 1, further comprising:
   identifying categorization information for a first data field of the one or more data fields; and
   displaying the first data field in the resubmission window based on the order of appearance and the categorization information.

5. The method of claim 1, further comprising controlling the resubmission window to constantly stay at a predetermined position on a screen displaying the resubmission window.

6. The method of claim 1, wherein the resubmission window is one of:
   a floating div;
   a popup window generated based on a scripting language; and
   a second form in a separate tab or window in a browser.

7. The method of claim 1, further comprising, upon submission of the web form, precluding a user of the web form from going back to the web form for a data input.

8. The method of claim 1, further comprising:
   identifying an erroneous input for a first data field in one or more data fields, wherein the erroneous input is submitted from the resubmission window; and
   displaying the first data field in a second resubmission window.

9. The method of claim 1, further comprising displaying a reminder of a correct data input format for one or more data fields of the plurality of data fields in the resubmission window.

10. The method of claim 1, further comprising maintaining an association table that maintains association information between the first data field and the associated data field.

11. A non-transitory computer-readable storage medium storing instructions that when executed by a computer cause the computer to perform a method for re-entering erroneously entered data fields in a web form, the method comprising:
   obtaining, by the computer, inputs via a plurality of data fields in the web form based on an electronic submission of the web form;
   identifying a plurality of data fields with erroneous inputs in the web form;
   restructuring the identified data fields based on an order of appearance of the identified data fields in the web form;
   displaying the restructured data fields in a resubmission window distinct from the web form without displaying a data field of the web form with a correct input, wherein the resubmission window allows a user to reenter inputs into the restructured data fields and electronically submit the resubmission window;
   identifying a name and a current value of an associated data field for a first and a second data fields of the plurality of data fields;

grouping the first and the second data fields into a group in the resubmission window based on the associated data field; and displaying the name and the current value of the associated data field with the group in the resubmission window once.

12. The non-transitory computer-readable storage medium of claim 11, wherein identifying the one or more data fields comprises determining whether a first data field of the one or more data fields is associated with an error message.

13. The non-transitory computer-readable storage medium of claim 12, wherein the method further comprises displaying the error message with the first data field in the resubmission window.

14. The non-transitory computer-readable storage medium of claim 11, wherein the method further comprises:
identifying categorization information for a first data field of the one or more data fields; and
displaying the first data field in the resubmission window based on the order of appearance and the categorization information.

15. The non-transitory computer-readable storage medium of claim 11, wherein the method further comprises controlling the resubmission window to constantly stay at a predetermined position on a screen displaying the resubmission window.

16. The non-transitory computer-readable storage medium of claim 11, wherein the resubmission window is one of:
a floating div;
a popup window generated based on a scripting language; and
a second form in a separate tab or window in a browser.

17. The non-transitory computer-readable storage medium of claim 11, wherein the method further comprises, upon submission of the web form, precluding the user of the web form from going back to the web form for a data input upon submission.

18. The non-transitory computer-readable storage medium of claim 11, wherein the method further comprises:
identifying an erroneous input for a first data field in one or more data fields, wherein the erroneous input is submitted from the resubmission window; and
displaying the first data field in a second resubmission window.

19. The non-transitory computer-readable storage medium of claim 11, wherein the method further comprises displaying a reminder of a correct data input format for one or more data fields of the plurality of data fields in the resubmission window.

20. The non-transitory computer-readable storage medium of claim 11, wherein the method further comprises maintaining an association table that maintains association information between the first data field and the associated data field.

21. A computing system for re-entering erroneously entered data fields in a web form, the computing system comprising:
a processor;
a memory coupled to the processor and storing instructions, which when executed by the processor cause the processor to perform a method, the method comprising:
obtaining inputs via a plurality of data fields in the web form based on an electronic submission of the web form;
identifying a plurality of data fields with erroneous inputs in the web form;
restructuring the identified data fields based on an order of appearance of the identified data fields in the web form;
displaying the restructured data fields in a resubmission window distinct from the web form without displaying a data field of the web form with a correct input, wherein the resubmission window allows a user to reenter inputs into the restructured data fields and electronically submit the resubmission window;
identifying a name and a current value of an associated data field for a first and a second data fields of the plurality of data fields;
grouping the first and the second data fields into a group in the resubmission window based on the associated data field; and
displaying the name and the current value of the associated data field with the group in the resubmission window once.

* * * * *